(12) United States Patent
Ibrahim

(10) Patent No.: US 9,960,624 B2
(45) Date of Patent: May 1, 2018

(54) METHOD FOR CONFIGURABLE AIRCRAFT USB POWER LEVEL MANAGEMENT

(71) Applicant: The Boeing Company, Chicago, IL (US)

(72) Inventor: Yakentim M. Ibrahim, Brier, WA (US)

(73) Assignee: The Boeing Company, Riverside, IL (US)

( * ) Notice: Subject to any disclaimer, the term of this patent is extended or adjusted under 35 U.S.C. 154(b) by 208 days.

(21) Appl. No.: 14/706,274

(22) Filed: May 7, 2015

(65) Prior Publication Data
US 2016/0329724 A1    Nov. 10, 2016

(51) Int. Cl.
*H02J 7/00* (2006.01)

(52) U.S. Cl.
CPC ............ *H02J 7/007* (2013.01); *H02J 7/0013* (2013.01); *H02J 7/0021* (2013.01); *H02J 7/0052* (2013.01); *H02J 2007/0062* (2013.01)

(58) Field of Classification Search
CPC ........ H02J 7/045; H02J 7/0086; H02J 7/0021; H02J 2007/0049; H02J 7/0047; H02J 7/0078; H02J 7/044
USPC .......................................................... 320/162
See application file for complete search history.

(56) References Cited

U.S. PATENT DOCUMENTS

| 6,016,016 | A  | * | 1/2000 | Starke ................... | B64F 5/0045 307/38 |
| 2006/0246892 | A1 | * | 11/2006 | vonDoenhoff ........ | H04W 28/16 455/427 |
| 2014/0320075 | A1 | * | 10/2014 | Baurle ................ | G06F 13/4282 320/108 |
| 2015/0084584 | A1 | * | 3/2015 | Monks ................... | H02J 7/025 320/108 |

* cited by examiner

*Primary Examiner* — Drew A Dunn
*Assistant Examiner* — Sailesh Thapa
(74) *Attorney, Agent, or Firm* — McDonnell Boehnen Hulbert and Berghoff LLP

(57) ABSTRACT

Within examples, systems for power distribution within the cabin of an aircraft are provided and methods for operation. The system includes a passenger seat of the aircraft. The passenger seat includes a charging module. The charging module is configured to supply power to a connected device of the passenger seat. The passenger seat also includes a passenger control unit (PCU) coupled to the charging module. The passenger control unit is configured to determine a power requirement for the connected device. Additionally, the passenger seat is associated with a seat grouping of the aircraft. The seat grouping of the aircraft includes at least one passenger seat. Further, the power distribution system includes a power supply configured to supply power to at least one charging module based on the determined power requirement.

20 Claims, 6 Drawing Sheets

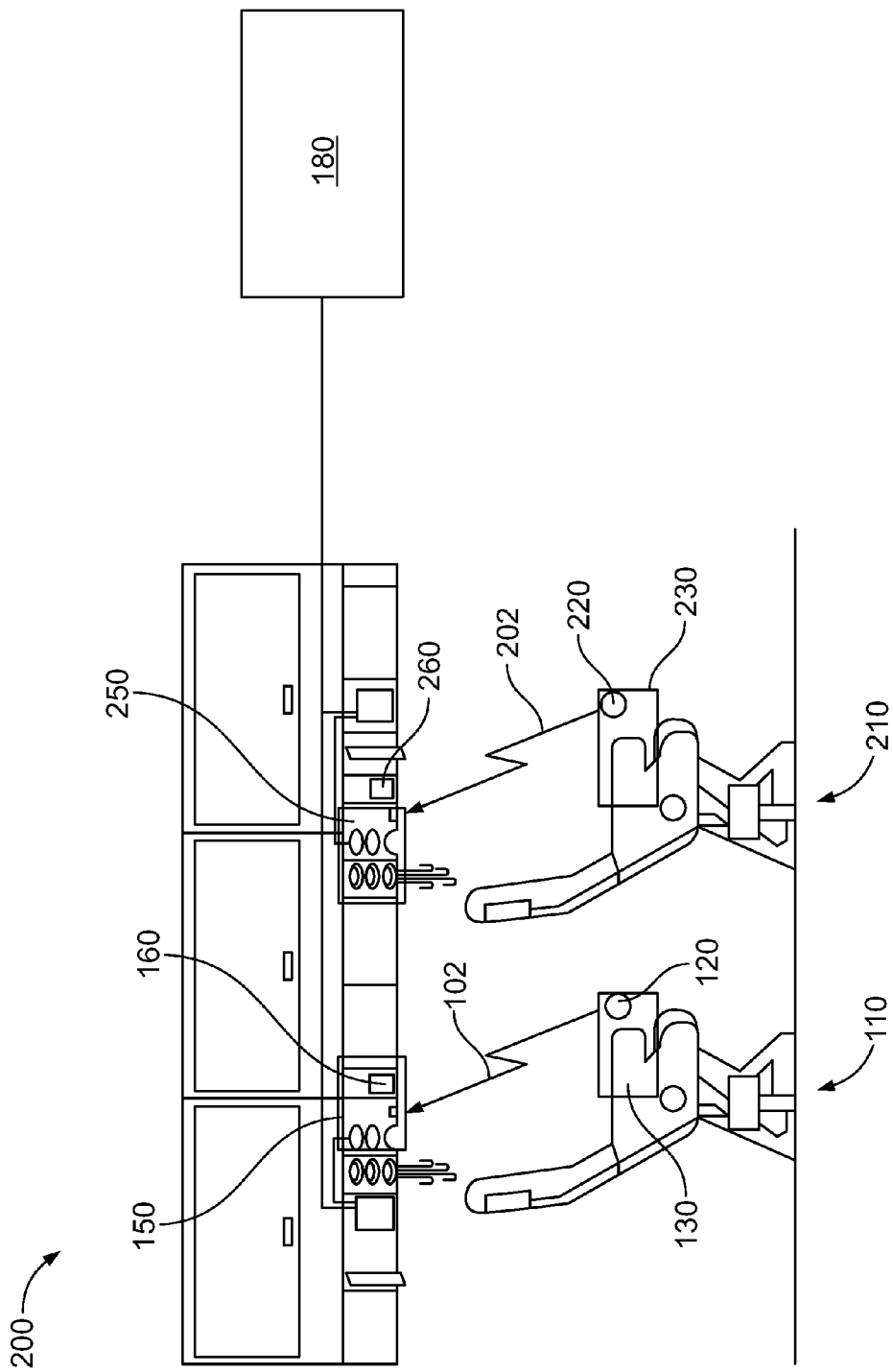

METHOD FOR CONFIGURABLE AIRCRAFT USB POWER LEVEL MANAGEMENT

FIELD

The present disclosure relates generally to an aircraft electronic system. In further examples, methods and systems for distributing power throughout an aircraft without the need for seat-back entertainment systems are provided.

BACKGROUND

The electrical system of an aircraft is designed to distribute both power and communicate signals throughout the aircraft. The electrical system may be divided between several different systems. Example systems may include aircraft avionics and cabin systems. The aircraft avionics may be the electrical systems designed to both aid and control the aircraft's flight. The cabin systems may be the electrical systems that provide power to various components within the cabin of the aircraft. For example, the cabin systems may include those systems that do not deal with the flight of the aircraft. Example cabin systems include entertainment systems, lighting systems, among others.

The cabin systems may include electrical systems designed to enhance passenger experiences on an aircraft, such as a passenger services system. The interior lighting, entertainment, and power charging provided throughout the aircraft may form a part of the passenger services system. Interior lighting systems may include general cabin lights, emergency lights, as well as passenger seat reading lights. The entertainment systems may include both seat back and overhead audio visual systems. And, the power charging system may include an electrical system designed to provide electrical power allowing passengers to charge and operate electronic devices. Traditionally, many of the passenger services have been controlled through the entertainment system of the aircraft. For example, overhead lights, call lights, and other components of the passenger services system may be enabled or disabled by a passenger through the operation of the entertainment system. In one example, a button on the entertainment system may control the operation of an overhead reading light.

In some instances, it may be desirable for an aircraft to have fewer components in at least one of systems that form the passenger services system. However, because the removal of some components may impact some of the functions performed by the various systems of the passenger services system, it may be desirable for passenger services system functionality to be moved to components that are not removed from the system.

SUMMARY

In one example, a power distribution system in an aircraft is provided. The system includes a passenger seat of the aircraft. The passenger seat includes a charging module. The charging module is configured to supply power to a device connected to a charging port of the passenger seat. The passenger seat also includes a passenger control unit (PCU) coupled to the charging module. The passenger control unit is configured to determine a power requirement for the connected device. Additionally, the passenger seat is associated with a seat group of the aircraft. The seat group of the aircraft includes at least one passenger seat. Further, the power distribution system includes a power supply configured to supply power to at least one charging module based on the determined power requirement.

In another example, a method of distributing power in an aircraft is provided. The method includes providing a device connection via a charging module at a passenger seat. The passenger seat is associated with a seat group of the aircraft. The seat group of the aircraft includes at least one passenger seat. The device connection supplies power to a connected device. The method further includes determining a power requirement for a connected device via a passenger control unit (PCU) of the passenger seat. Additionally, the method includes supplying power to at least one charging module based on the determined power requirement via a power supply.

In yet another example, another method of distributing power in an aircraft is provided. The method includes assigning passenger seats of an aircraft to a seat group. Additionally, for the seat group, the method includes supplying power to a passenger control unit (PCU) of the passenger seat via a power supply. Further, for the seat group, the method includes determining a priority for connected devices within the group via a master PCU. Yet further, for the seat group, the method includes providing power to a respective PCU of the group based on the determined priority via the master PCU. Additionally, for the passenger seat, the method includes providing a device connection via a charging module at the passenger seat. The device connection of the passenger seat is configured to supply power to a connected device. Further, for the passenger seat, the method includes determining a power requirement for a connected device with the PCU of the passenger seat. Yet further, for the passenger seat, the method includes communicating the power requirement from the PCU of the passenger seat to the master PCU. Moreover, for the passenger seat, the method includes supplying power provided by the power supply to at least one charging module.

The features, functions, and advantages that are discussed in the present disclosure can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 2 is a diagrammatic representation of an example passenger service system of an aircraft;

DETAILED DESCRIPTION

Certain examples will now be described with reference to the accompanying drawings, in which some, but not all possible examples are shown. Indeed, several different alternatives are possible and the invention should not be construed as being limited to the examples set forth herein.

As previously discussed, many traditional aircraft passenger service systems are controlled through a traditional entertainment system with which a passenger can interact. The traditional entertainment system may include a screen mounted in a seat back and electrical components configured to control and/or interact with various other aircraft systems, such as components of the passenger services system. Thus, when an aircraft is constructed without an entertainment system (or with a more simple entertainment system), the passenger services system may need to be controlled and interacted with in ways other than via the entertainment system. The present disclosure is directed toward a power distribution system to enable passenger charging of devices via a USB port associated with a passenger seat of an aircraft that does not include a traditional entertainment system associated with the passenger seat.

Although the present disclosure is directed toward aircraft systems, it is not limited to aircraft-based systems. Examples may also be used in other vehicular systems such as cars, trains, and busses. Further, the present disclosure may also be used in the context of power delivery in rooms, such as an auditorium or classroom.

Figure 1:
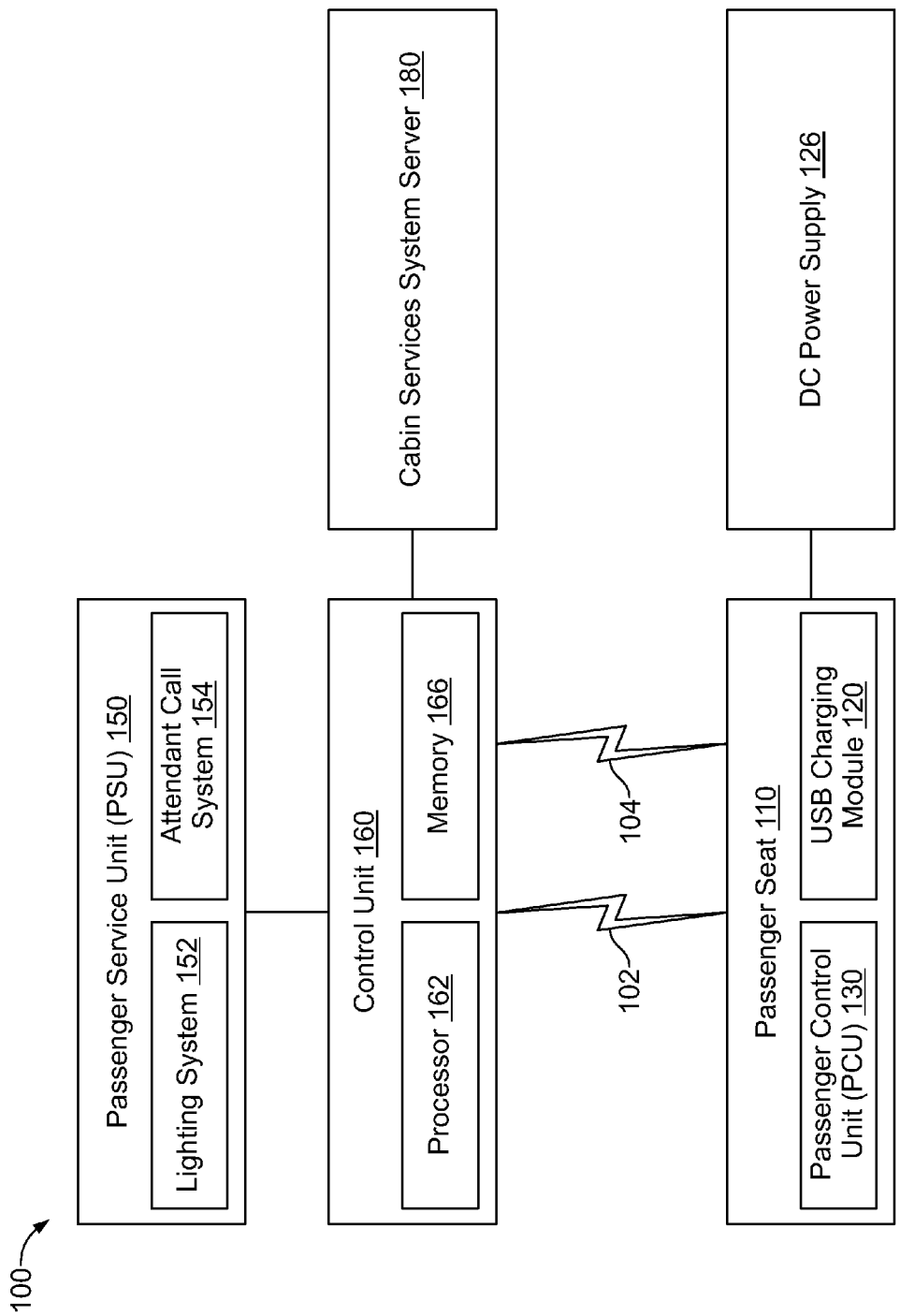
FIG. 1 is a block diagram of example systems within the cabin of an aircraft.

FIG. 1 is a block diagram of example functions within the cabin of an aircraft. The passenger services system 100, in part, enables one or more cabin-services functions of a passenger control unit (PCU) associated with a passenger seat in an aircraft, such as controlling the reading light and call light associated with a seat. A passenger service unit (PSU) 150 may be associated with one or more passenger seats (such as a row of passenger seats) by being situated in an overhead panel above, or in a panel beside, the passenger seats. A passenger may interact with components of the PCU to control the functionality of the PSU. Among other things, a PSU may include various sub-components, such as one or more cabin services functions (e.g., a lighting function 152 or an attendant call function 154) that may be configured to operate reading lights, speakers, illuminated signs, attendant call lights, air control units, or a combination thereof.

As previously discussed, the PSU 150 of the passenger services system 100 may include one or more cabin services functions, such as a lighting function 152 and an attendant call function 154. The passenger services system may be configured to provide at least one cabin service (e.g., lighting and attendant call functions) to one or more passenger seats, such as the representative passenger seat 110 that is associated with the PSU 150. The lighting function 152 may include one or more reading lights associated with the passenger seat 110 and the attendant call function 154 may include one or more attendant call lights. The attendant call function 154 is configured to send a notification to another system to notify an attendant that a passenger is in need of assistance. For example, the attendant call function 154 may be configured to sound a chime and relay a signal to a display where an attendant receives an alert.

The passenger services system 100 may include one or more control units, such as a representative control unit 160.

The control unit 160 may be configured to control one or more cabin services functions associated with the PSU 150. In some examples, the control unit 160 may be coupled to the PSU 150 or it may be located within the PSU 150. The control unit 160 may include a processor 162 and a memory 166. The memory 166 may store instructions that are executable by the processor 162 to perform one or more operations described herein.

The control unit 160 may include a communication interface (not shown). The communication interface of the control unit 160 may enable the control unit 160 to be in communication with both the PSU 150 and the PCU 130 via an uplink signal 102 and a downlink signal 104. The PSU 150 and the PCU 130 may be in communication with each other via signals 102 and 104 in either a wired or wireless manner. For example, the control unit 160, PSU 150, and the PCU 130 may be configured to communicate via a Zigbee, Wifi, infrared, or other wireless connection via the uplink signal 102 and the downlink signal 104. In wired examples, the control unit 160, PSU 150, and the PCU 130 may be configured to communicate over an Ethernet connection, RS-485 connection, or other wired connection. Additionally, the components may be connected in a different order (or in a different configuration) than that shown in FIG. 1.

The passenger seat may include a USB charging module 120. The USB charging module 120 may be coupled to or form part of the PCU 130. The USB charging module 120 may include a USB port (not shown) mounting in the passenger seat 110. The USB port may be configured to supply electricity to power and/or charge devices that are connected to the port. In some examples, the USB port may only be able to supply a finite amount of power. Therefore, devices that require more power for charging than the USB port is configured to receive may not operate in a charging mode. In some examples, a master PCU of a group of PCUs may control the charging of devices. In other examples, the control unit 160 may be in communication with a cabin services system server 180 to control the charging of devices.

The USB charging module 120 may also be configured to determine a power requirement for a device plugged into the USB port (in some alternatives, the same functionality may be performed by a PCU 130 of the passenger seat 110). In one example, when a USB device is connected to the USB port, the USB charging module 120 initiates a handshake procedure. During this handshake procedure, the USB device may provide an indication of how much power it is requesting. The USB charging module 120 may use this power request as the power requirement for the USB device. In a different example, during this handshake procedure, the USB device may provide a device identification. The USB charging module 120 may use this device identification to either determine or look up the power requirement for the USB device. In a yet further example, when the USB device is connected to the USB port, it may begin to draw power (in the form of a current draw at the USB voltage). The USB charging module 120 may determine the requirement for the USB device based on the power (and/or current) draw when the USB device is connected to the USB port. Additionally, in some examples the USB charging module 120 may determine two different power levels for a USB device. The first power level may be a power level that enables the device to operate and charge the device's battery, while the second power level may only enable a device to operate, but not charge.

In one embodiment, a passenger seat 110 within a group of passenger seats may have a respective PCU 130 and a USB zone of passenger seats may have a respective master PCU 130. A USB zone of passenger seats may be defined based on an area of an aircraft, a row of passenger seats of an aircraft, a portion of a row of passenger seats of an aircraft, or the USB zone of seats may be defined in a different way. The master PCU 130 may be configured to monitor the power requirements for the various USB device (s) connected to USB charging module(s) 120 within the respective USB zone of passenger seats. The master PCU may monitor both the power requirements to charge the USB devices as well as the power requirements to operate the USB devices.

The passenger seat 110, and in turn the PCU 130 and the USB charging module 120, may be coupled to a DC Power Supply 126. The DC Power 126 supply may be configured to both (i) convert a high voltage from a power distribution system of the aircraft to a lower voltage for use in the seat-based components and (ii) provide power to a group of passenger seats, each of which may be similar to passenger seat 110. The DC Power supply 126 may be configured to provide up to a specified amount of power across a group of passenger seats. Further, in some examples, the DC Power Supply 126 may provide power to one or more master PCUs to which it is connected. In some examples, each PCU may receive a predetermined amount of electrical power.

The master PCU may be further configured to determine a priority for USB device(s) connected to USB charging module(s) 120 within the respective passenger seats in USB zones. Based on the determined priority, the master PCU may control how much power various connected USB device receives. The priority may be determined based on a power requirement for the USB device(s), the order in which the USB device(s) were connected to the respective USB module 120, or a predicted time to charge the respective USB device. Additionally, the master PCU may be further configured to periodically update the priority for the various USB devices. For example, the master PCU may be configured to update the priority based on a time interval, such as every 2 minutes. In another example, the master PCU may update the priority based on an amount of time a respective device has been charging.

In some cases, the USB devices may request more power than the can be supplied. Therefore, in one example, the PCU may determine the priority for the various USB devices in order to make sure the devices receive enough power to allow the device to operate.

Additionally, the master PCU may update the priority based on the charging and operating power levels for the various USB devices. For example, the master PCU device may allow one of the connected USB devices to charge while supplying enough power for the other USB devices to operate, but not charge. After some time, the master PCU may switch to allow a different USB device to charge, while the others may only receive enough power to operate.

In a yet further example, the priority may be determined based on whether or not a passenger has paid for charging ability. For example, a passenger may receive enough power to operate a device for free, but for the ability to charge the device, a passenger may pay a fee.

In a different example, one or more identifiers, such as a PCU code, may be used to identify a single passenger seat (e.g., the passenger seat 110) and associated USB charging module (e.g., charging module 120), a group of passenger seats, a zone of an aircraft (e.g., first class, economy class, or business class), or a combination thereof. For example, an identifier, such as a particular PCU code associated with a group of passenger seats in an aircraft (e.g., a row of passenger seats such as Row 1), may be used to identify the group of passenger seats for purposes of providing cabin services to the group. An identifier may include index information that identifies a source (e.g., a passenger seat associated with a PCU 130 or USB Charging module 120) of the uplink and downlink signals 102, 104. For example, the index information may identify the passenger seat 110 in a group of passenger seats for which the uplink and downlink signals 102, 104 were transmitted to request cabin services.

When the uplink signal 102 originates from the PCU 130 that is associated with a passenger seat (e.g., the passenger seat 110) that is located at position "A" in row "1" of the aircraft, the identifier may include index information such as "1A," which identifies the source (the passenger seat 110 located at position "A" in row "1") from which the uplink signal 102 originated (i.e. a PCU code). The memory 164 of the control unit 160 may include information associating one or more identifiers (e.g., a transmitting PCU identifier or a PCU code) with one or more USB Charging modules, with a zone of an aircraft, with a passenger seat, or with a group of passenger seats that are provided cabin services by the PSU 150.

The PSU 150 may provide cabin services in response to signals received from a source that is associated with the PSU 150. The uplink and downlink signals 102, 104 sent by the PCU 130 of passenger seat 110 may include cabin service control information that includes information identifying one or more cabin services. The cabin service control information may indicate a requested cabin service, one or more functions associated with a cabin service, other control information (e.g., commands, configurations, and control settings) associated with a cabin service, or a combination thereof. For example, the uplink and downlink signals 102, 104 may include USB power request information, as previously discussed.

In a particular example, the control unit 160 may be configured to communicate with a server 180 (e.g., a cabin services headend unit) coupled to the control unit 160. The control unit 160 may be communicatively connected to the server 180 via one or more computing systems (e.g., zone units) associated with one or more zones (e.g., a section of a cabin or class of the cabin). The one or more computing systems may communicate information from one or more zones to the server 180. The information communicated from the one or more zones may include information received from the control unit 160.

During operation, a passenger seated in the passenger seat 110 may plug a device into USB charging module 120 via a USB port mounted on or within passenger seat 110. When the device is plugged into the USB port, the device and the USB charging module 120 may perform a handshake. The handshake may enable the USB device to provide identification information and/or power request information. The USB charging module 120 may communicate this information to the PCU 130. In a first example, the PCU 130 may be in communication with a control unit 160 via uplink and downlink (communication) signals 102, 104. The communication signals 102, 104 between the PCU 130 and the control unit 160 may be either wired or wireless signals, depending on the configuration. In a second example, the PCU 130 may be in communication with a master PCU (not shown) or the PCU 130 may function as the master PCU on its own. The communication between the PCU 130 and the master PCU may be either wired or wireless signals, depending on the configuration. In both examples, a DC Power supply 126 may be coupled to the USB charging module 120 via the PCU 130 to provide power to the device to be charged (or powered).

In the first example, the control unit 160 may further communicate the power request information to a server 180. The server 180 may be configured to determine a priority for various devices that are plugged in to USB ports within a group of passenger seats of the aircraft. In some examples, a single server 180 determines a priority for various devices that are plugged in to USB ports for the entire aircraft. In other examples, multiple servers may determine priority for various devices that are plugged in to USB ports for the entire aircraft, such as a single server 180 for one or more zones of the aircraft. The server 180 may determine the priority for the various USB devices based on the examples given previously with respect to a master PCU determining the priority. The server 180 may responsively cause the power provided by DC Power supply 126 to the USB charging modules to vary based on the determined priority. In one example, the server 180 communicates the priority to the PCU 130 via the control unit 160 in order to control the power distribution.

In the second example, the master PCU may be configured to control the distribution of power across the USB module(s) 120 of the passenger seats within a seat group. The master PCU may determine the priority for the various USB devices based on the examples given previously. In one example, the master PCU may responsively cause the power provided by DC Power supply 126 to the USB charging modules of the seat group to vary based on the determined priority. In one example, master PCU communicates the priority to the various PCU(s) 130 in order to control the power supply.

In other examples, a passenger services system may include a plurality of passenger seats, each including a USB charging module 120 coupled to a PCU 130 to enable charging of a device plugged into the USB charging module. For example, in FIG. 2, a diagram of a first example of a passenger services system 200 is shown. The passenger services system 200 may include, be included in, or correspond to the block diagram of a passenger services system 100 of FIG. 1 as shown. Additionally, first passenger seat 110 and second passenger seat 210 may both be part of the same USB group.

The passenger services system 200 may include a plurality of passenger seats 110, 210 coupled to a DC power supply 126. For example, the first and second passenger seats 110, 210 may be part of the same USB group, and DC power supply 126 may power that USB group. As shown in FIG. 2, a USB group may include multiple passenger seats 110, 210 and the other seats in the row (not shown). Further, a USB group may be specified based on rows and aisles of an aircraft. For example, the USB group shown in FIG. 2 may include first and second passenger seats 110, 210 and the other seats in the respective rows of first and second passenger seats 110, 210 that are on the same side of the aisle of the aircraft. USB groups will be discussed further with respect to FIGS. 3A, 3B, and 4 below.

First and second passenger seats 110, 210 may include respective first and second USB charging modules 120, 220 that includes a USB port. As previously discussed, the first and second USB charging modules 120, 220 may be configured to connect to a device of the passenger, such as a mobile phone, tablet computing device, etc. The first and second USB charging modules 120, 220 may be configured to supply power to the device to either provide enough power for the device to operate or to charge the device. Because charging the device requires more power than just device operation, in some instances it may be desirable to limit the number of devices being charged, so the total power draw of various devices is below a threshold amount of power that a DC Power Supply 126 can supply.

First and second passenger seats 110, 210 may also include first and second PCUs 130, 230 that are coupled to the first and second USB charging modules 120, 220. As previously discussed, the first and second PCUs 130, 230 may be configured to determine a power requirement for a device attached to the first and second USB charging modules 120, 220. The first and second PCUs 130, 230 of the first and second passenger seats 110, 210 may be configured to communicate with each other and/or with first and second control units 160, 260 via first and second signals 102, 202. In some examples, one of PCU 130, 230 may function as a master PCU configured to determine a priority for the various connected devices and control the amount of power delivered to first and second PCUs 130, 230 from a DC power supply 126. In other examples, a server 180 may be configured to determine a priority for the various connected devices and control the amount of power delivered to first and second PCUs 130, 230 from a DC power supply 126.

The seat groups of the aircraft may be coupled to a power supply, such as DC power supply 126. A DC power supply, such as representative DC power supply 126, may be associated with a corresponding USB group of the aircraft. For example, the DC power supply 126 of FIG. 2 is configured to provide power to the USB group that includes passenger seats 110 and 210. The DC power supply 126 may provide power to first and second PCUs PCU 130, 230 of first and second passenger seats 110, 210. In some examples, one of the PCUs may function as a master PCU. The master PCU may determine how much power the PCUs within the USB group receive based on a priority of the devices connected to the first and second USB charging modules 120, 220 of the respective passenger seat 110, 210.

Figure 3A:
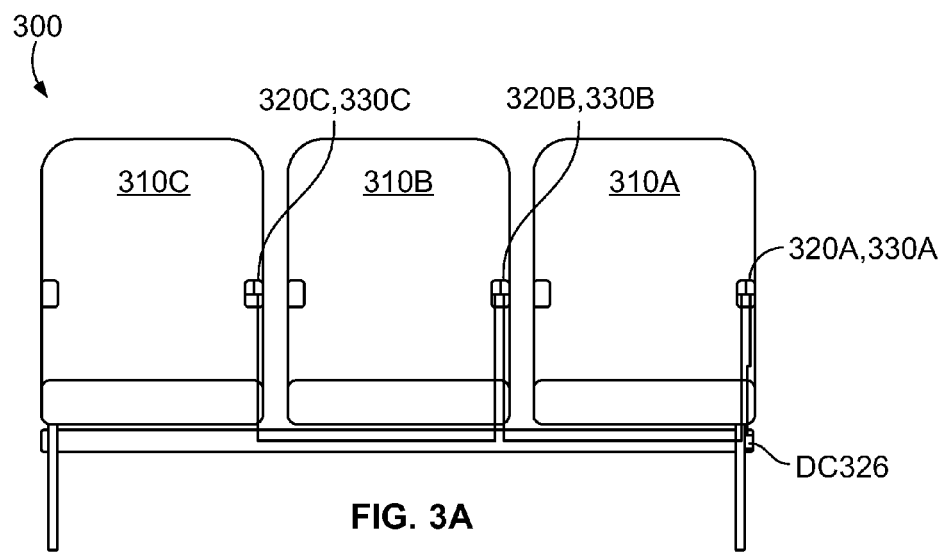
FIG. 3A is a diagrammatic representation of a front view of an example passenger seat configuration of an aircraft.
Figure 3B:
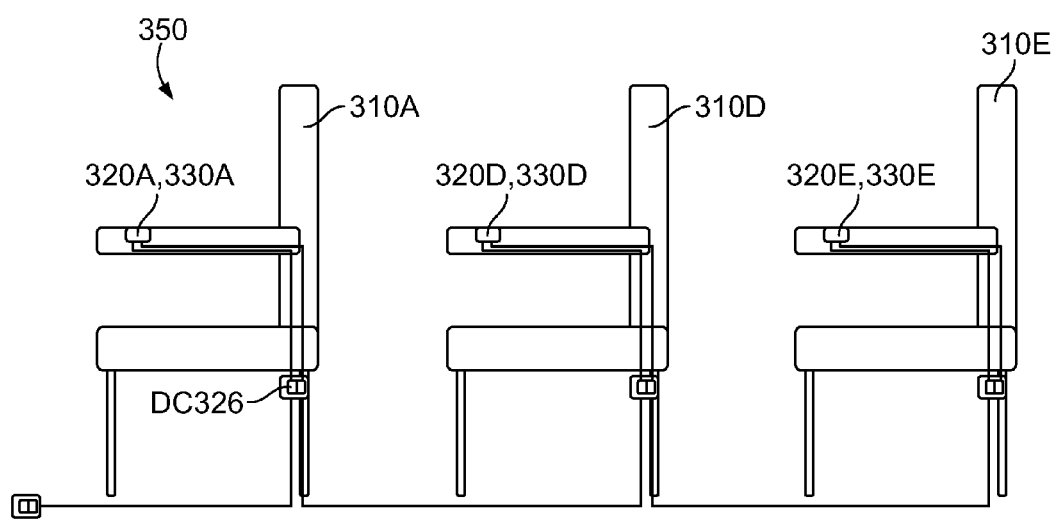
FIG. 3B is a diagrammatic representation of a side view of an example passenger seat configuration of an aircraft.

Referring to FIG. 3A, a diagram of a front view of passenger seat configuration 300 for a USB group of an aircraft system is shown. And in FIG. 3B, a side view of passenger seat configuration 350 for the USB group of an aircraft system is shown. As shown in FIG. 3A, an example USB group may have three seats in each row of seats, indicated by the passenger seats 310A, 310B, and 310C. And, as shown in FIG. 3B, the example USB group may have three rows of seats, indicated by the passenger seats 310A, 310D, and 310E. Thus, in the example shown in FIGS. 3A and 3B, an example USB group of an aircraft system may contain nine seats (three rows each containing three seats). However, other possible configurations of seats for a USB group are possible as well.

As shown in FIGS. 3A and 3B, each passenger seat 310A-310E may have a corresponding USB charging module 320A-320E. In one example, the USB charging module 320A-320E may be mounted in an armrest of the respective passenger seat 310A-310E. Alternatively, the USB charging module 320A-320E may also be mounted in other locations, such as a seatback. Further, in some examples USB charging modules may be mounted in a greater or few number than shown in FIGS. 3A and 3B. For example, each armrest (or seat back) may contain two USB ports. In an alternative, each row of three seats may contain only two USB ports. The USB charging modules 320A-320C may be connected to the other USB charging modules in the row of passenger seats 310A-310C. The USB charging modules 320A-320E may be configured to provide electricity to charge devices connected to the respective charging module based on power supplied by the DC power supply 326.

The amount of power supplied to USB charging modules 320A-320E from the DC power supply 326 may be controlled by the PCUs 330A-330E of the seats. For example, PCU 330A may be coupled to the USB charging modules 320A of the first row of seats. The PCU 330A may be configured to determine a charging priority (as previously discussed) for the devices attached to the USB charging modules 320A. The PCU 330A may then further control the amount of power delivered to USB charging modules 320A based on the determined charging priority. In a wired system, one PCU will serve as the master for the USB zone, monitoring messages reported from all PCUs regarding their respective USB and utilization, and using this information to control the amount of power delivered to respective USB charging modules 320A-320E within the USB zone based on the power needed to charge and/or power the respective device attached to the USB charging modules 320A-320E. In a wireless system, the network server will serve as the master for the USB zone, monitoring wireless messages reported from all PCUs regarding their respective USB utilization, and using this information to control the amount of power delivered to respective USB charging modules 320A-320E within the USB zone based on the power needed to charge and/or power the respective device attached to the USB charging modules 320A-320E.

FIGS. 3A and B are one example configured of the layout for the USB charging modules 320A-320E, DC power supply 326, and the PCUs 330A-330E. As previously dicussed, in some examples, fewer USB charging modules may be provided, such as one or two USB charging modules per row of seats. In other examples, each row may have its own DC power supply 326. In yet further examples, there may be more or fewer than nine seats in a group associated with a DC power supply 326. In this example, there may also be a master PCU, or one of the PCUs may function as a master PCU. The master PCU may be configured to determine the priority of connected devices and control the power distributed from the DC power supply 326.

Additionally, as previously discussed, at least one of the PCUs 330A-330E may be in communication with a server (show as 180 in FIG. 1). The PCUs 330A-330E may relay information about devices connected to the USB charging modules 320A-320E, such as a power requirement or a priority, to the server. The server may responsively control the power distributed from the DC power supply 326. The server may control the power by communicating with either the DC power supply 326 or the PCUs 330A-330E. For example, the PCU(s) may transmit information about connected devices to the server. The server may determine the charging priority (as previously discussed). The server may then responsively communicate the determined priorities back to the respective PCUs. The PCUs may then control the power distributed to the USB charging modules based on the priority determined by and communicated from the Cabin Services System Server.

Enabling power distribution to seat-based USB ports based on a PCU and a USB zone based DC power supply may reduce costs associated with wires, cables, and equipment to provide cabin services as compared to legacy systems. A passenger seat equipped with a USB port may be easily configured to provide power to a passenger's device without rearranging or replacing wiring throughout various electrical and communication systems in an aircraft.

Figure 4:
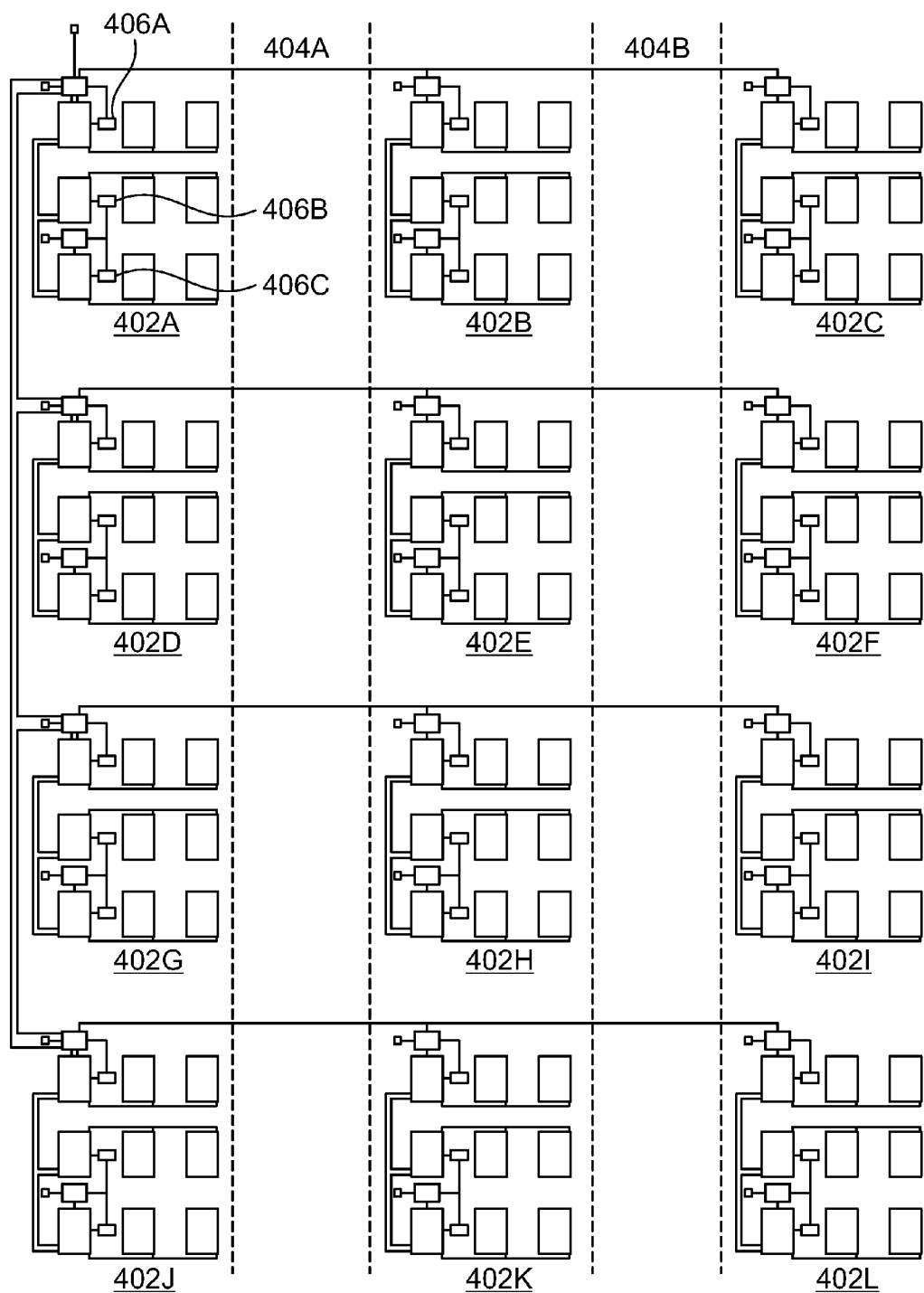
FIG. 4 is a diagrammatic representation of an overhead view of an example passenger seat layout of an aircraft.

FIG. 4 is a diagram of a passenger seat layout of an aircraft including 12 different USB zones 402A-402L. The USB zones 402A-402L of FIG. 4 may be similar to the example seat group discussed with respect to FIGS. 3A and 3B. As shown in FIG. 4, USB zones 402A-402L may be divided based upon the aisles 404A, 404B of the aircraft. In the example passenger seat layout shown in FIG. 4, USB zone 402A-402L contains 9 passenger seats. However, in other examples, seat groups may be divided differently based on seat configurations. For example, USB zones may be defined based on how seats are laid out with respect to the aisles of the aircraft. In some examples, the number of seats between the aisles 404A, 404B may be more or fewer then the three seats shown in FIG. 4. In some of examples, the seats between aisles 404A, 404B may be divided into two or more USB zones. In some examples, the number of seats outside of the aisles 404A, 404B may be more or fewer than three as well. For example, there may only be two seats per row on the outside (outboard side) of aisles 404A, 404B. Although FIG. 4 shows USB zones defined by rows, USB zones may also be defined by columns or by other means as well.

In the example shown in FIG. 4, each row (or column or grouping) within each USB zone 402A-402L may have its own DC power supply (indicated by representative DC power supplies 406A-406C of USB zone 402A). Therefore, the DC power supplies may be configured to supply power to three seats within the 9 seats of a seat group. However, in some examples, the distribution of DC power supplies may not be uniform across the aircraft. In one example, different seat categories may have different DC power supply configurations. For example, in a first class setting, a DC power supply may be configured to supply power to a fewer number of seats than in a coach seating section. By having a DC power supply provide power to a fewer number of seats, each seat may be able to have more power provided to its USB charging unit at the same time as other seats.

In one example, a DC power supply may be configured to supply 18 Watts of power. If the DC power supply is supplying two seats, each seat may be able to charge (or power) a device the will draw 9 Watts of power from the USB charging unit. Thus, if each device requires less than 9 Watts (or the total of the two devices is less than 9 Watts) then both devices may be supplied with their full power requirement. If the devices require more power, a master PCU of the USB zone, or a server of the aircraft, may determine a priority for the devices and the amount of power each device may receive. Alternatively, when the same 18-Watt power supply is used to supply power to a seat group with 9 seats, each seat can only draw an average of two Watts. As previously discussed, a master PCU of the USB zone, or a server of the aircraft, may determine a priority for the devices and the amount of power each device may receive for the 9 seats in the seat group. In this instance, it may be that less than all the devices may be able to be charged at the same time. Thus, the power delivered to the USB charging module may be varied based on the determined priority.

Figure 5:
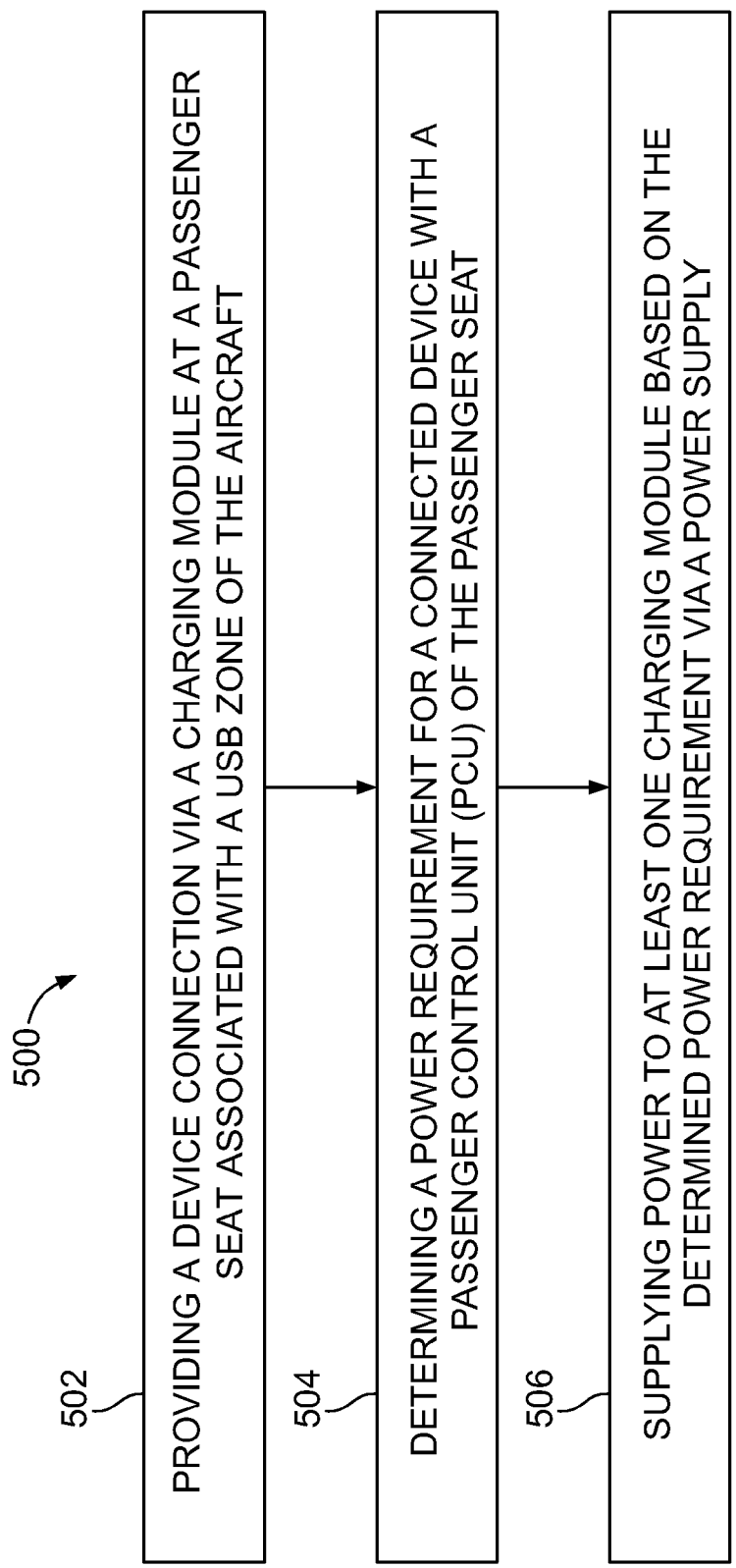
FIG. 5 is a flowchart illustrating a method for operating the distribution of power in an aircraft, according to one example.

FIG. 5 is an example method for operation of the distribution of power in an aircraft, according to one example. The method 500 may be performed by the systems depicted in FIG. 1 through FIG. 4, or a combination thereof.

At 502, the method 500 includes providing a device connection via a charging module at a passenger seat associated with a seat grouping of the aircraft. The device connection is configured to supply power to a connected device and the seat grouping of the aircraft comprises at least one passenger seat. The charging module may be configured with a USB port. The USB port allows a passenger seated in a passenger seat to plug a device into the USB port and have the device receive electrical power. The charging module may be mounted in an armrest of the passenger seat. In other examples, the charging module may be mounted in a seatback. When the charging module is mounted in a seatback, a passenger may plug his or her device into a charging module mounted in the seat in front of him or her.

In some examples, when a USB device is connected to the charging port, the USB device and a host in the charging port may perform a handshake procedure. As part of the handshake procedure, the USB device may indicate a power level to charge the device. Additionally, the USB device may also indicate a power level for the device to operate. Because charging a device typically requires more power than operating a device, the indicated power level to charge the device may be greater than the indicated power level to operate the device.

At 504, the method 500 includes determining a power requirement for a connected device with a passenger control unit (PCU) of the passenger seat. The PCU may receive at least one of the indicated power level to charge the device and the indicated power level to operate the device from the charging module. Based on the received power level(s) the PCU may communicate the receive power level(s) to either a master PCU or a server.

Either the master PCU or the server may determine a charging priority for devices connected to the various charging modules (and associated PCUs) and communicate the priority back to the PCU. The PCU may use this priority to determine a supplied power level for the device attached to the charging module. The supplied power level may be the charging power level, the operating power level, somewhere in between the charging power level and the operating power level, or no power at all.

At 506, the method 500 includes supplying power to at least one charging module based on the determined power requirement via a power supply. The PCU may control an amount of power delivered to the charging module from a DC power supply. The PCU may cause the USB Charging Module to supply an amount of power based on the determined power requirement and the associated priority of the respective device coupled to the charging module. Thus, various devices may be in different power states (i.e., some may be charging while others may be only operating) in order to limit the power draw from any one DC power supply of the aircraft.

Figure 6:
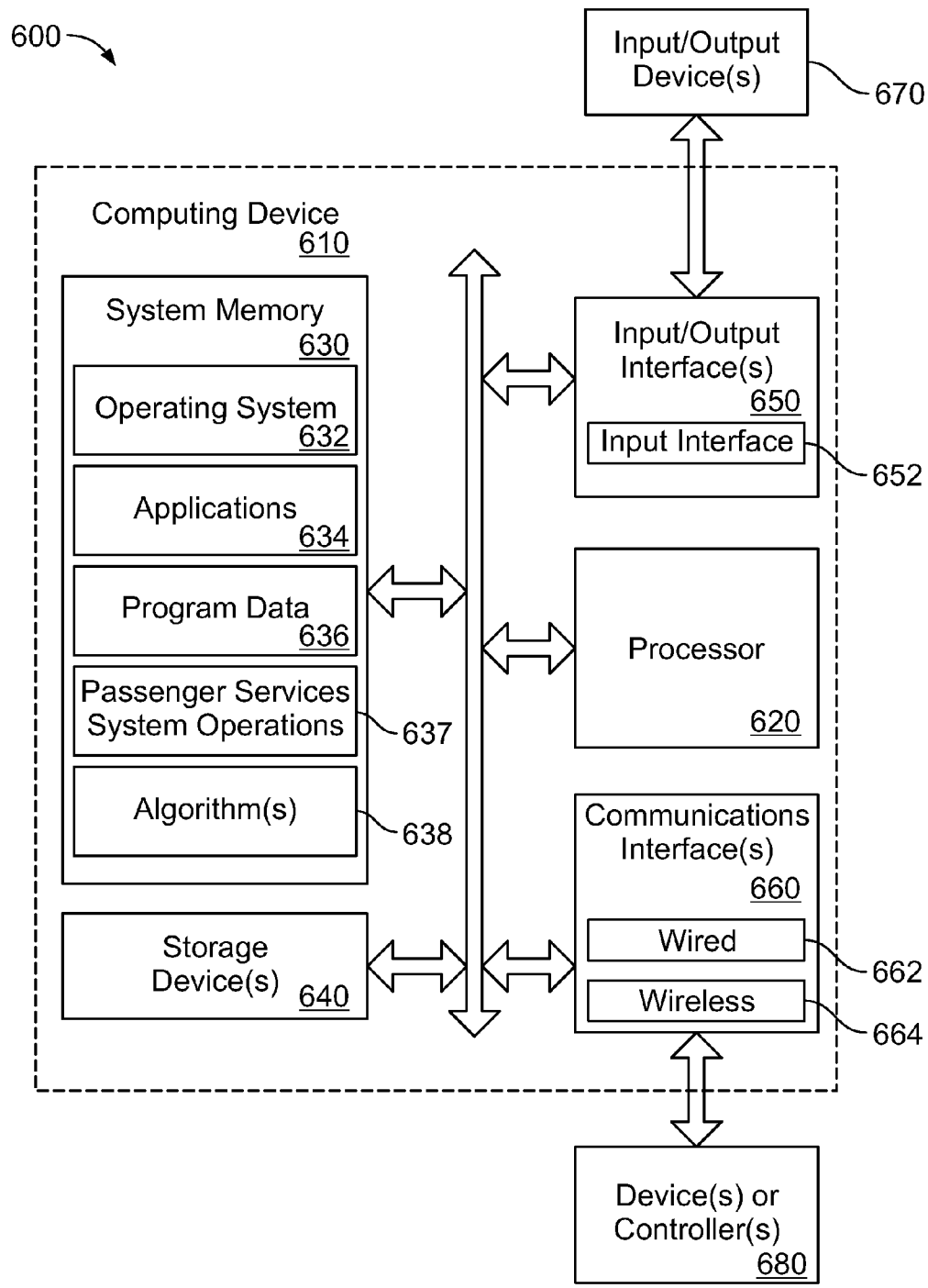
FIG. 6 is a diagrammatic representation of an exemplary computing system that may be used to implement one or more features of the disclosure.

FIG. 6 is a block diagram of a computing environment 600 including a general purpose computing device 610 operable to support communications and control the charging of devices coupled to a charging module. For example, the computing device 610, or portions thereof, may correspond to the USB charging module unit 120 of FIG. 1, the control unit 160 of FIG. 1, the PCU 130 of FIG. 1, the USB charging module 220 of FIG. 2, the control unit 260 of FIG. 2, the PCU 230 of FIG. 2, the USB charging modules 320A-320E of FIGS. 3A and 3B, the PCUs 330A-330E of FIGS. 3A and 3B, or any other device including a computing device disclosed herein.

The computing device 610 may include at least one processor 620. Within the computing device 610, the at least one processor 620 may communicate with a system memory 630, one or more storage devices 640, one or more input/output interfaces 650, one or more communications interfaces 660, or a combination thereof.

The system memory 630 may include volatile memory devices (e.g., random access memory (RAM) devices), nonvolatile memory devices (e.g., read-only memory (ROM) devices, programmable read-only memory, and flash memory), or both. The system memory 630 may include an operating system 632, which may include a basic input/output system for booting the computing device 610 as well as a full operating system to enable the computing device 610 to interact with users, other programs, and other devices. The system memory 630 may also include one or more applications 634, program data 636, passenger services system operations 637, and algorithm(s) 638. For example, the passenger services system operations 637 may include one or more operations described herein as being performed by the passenger services system 100 of FIG. 1, the passenger services system 200 of FIG. 2, or the systems of FIGS. 3A, 3B, and 4, or a combination thereof.

The passenger services system operations 637 may include one or more operations performed by the USB charging module unit 120 of FIG. 1, the control unit 160 of FIG. 1, the PCU 130 of FIG. 1, the USB charging module 220 of FIG. 2, the control unit 260 of FIG. 2, the PCU 230 of FIG. 2, the USB charging modules 320A-320E of FIGS. 3A and B, the PCUs 330A-330E of FIGS. 3A and 3B. The algorithms 638 may include the methods described herein, such as the method 500. The program data 636 may include data used by the applications 634 to perform respective functions of the applications 634.

The at least one processor 620 may also communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, applications and program data. In a particular example, the system memory 630, the storage devices 640, or both, include tangible, non-transitory computer-readable media. The storage devices 640 may store data used by one or more of the applications 634.

The at least one processor 620 may also communicate with one or more input/output interfaces 650. The input/output interface 650 may include the input interface 652. The input interface 652 may include, be included within, or correspond to the input to the various USB modules and/or PCUs. The one or more input/output interfaces 650 may enable the computing device 610 to communicate with one or more input/output devices 670 to facilitate user interaction. For example, the one or more input/output interfaces 650 may be adapted to receive input from the user, to receive input from another computing device, or a combination thereof. The input/output interfaces 650 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 670 may include user interface devices and displays, including some combination of buttons, keyboards, pointing devices, displays, speakers, microphones, touch screens, and other devices.

The at least one processor 620 may communicate with other device(s) or controller(s) 680 and/or other devices via the one or more communications interfaces 660. The one or more communications interfaces 660 may include wired interface 662 and/or wireless interface 664, in the forms of wired Ethernet interfaces, IEEE 802 wireless interfaces, Bluetooth communication interfaces, electrical, optical or radio frequency interfaces, infrared interfaces, or other wired or wireless interfaces. The other device(s) or controller(s) 680 may include host computers, servers, workstations, portable computers, telephones, tablet computers, or any other communication device or component.

The illustrations of the examples described herein are intended to provide a general understanding of the structure of the various examples. The illustrations are not intended to serve as a complete description of all of the elements and features of apparatus and systems that utilize the structures or methods described herein. Many other examples may be apparent to those of skill in the art upon reviewing the disclosure. Other examples may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific examples shown. This disclosure is intended to cover any and all subsequent adaptations or variations of various examples. Combinations of the above examples and other examples not specifically described herein will be apparent to those of skill in the art upon reviewing the description.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A power distributing system in an aircraft, the system comprising:
    a plurality of passenger seats of the aircraft, where a seat of the plurality of seats comprises:
    a charging module, wherein the charging module is configured to (i) supply power to a connected device by way of a USB port and (ii) perform a handshake procedure with the connected device, wherein the handshake procedure comprises receiving an indication of both (i) a first power level to charge the connected device and operate the connected device and (ii) a second power level to operate the connected device but not charge the device;
    a passenger control unit (PCU) coupled to the charging module, wherein the passenger control unit is configured to determine a supplied power level for the connected device, based on at least one of the indicated first power level and the second power level; and
    a power supply configured to supply power to the at least one charging module based on the supplied power level.

2. The power distributing system of claim 1, wherein each of the plurality of seats is associated with a seat group of the aircraft, wherein the seat group comprises at least one passenger seat, and wherein each seat group comprises a master PCU.

3. The power distributing system of claim 2, wherein the master PCU is configured to communicate with each PCU of the seat group to determine a supplied power level of each connected device for each respective PCU.

4. The power distributing system of claim 3, wherein the master PCU is further configured to control the power supplied by the power supply, based on the supplied power level of each connected device for each respective PCU.

5. The power distributing system of claim 3, wherein the master PCU is further configured to determine a charging priority for each connected device for each respective PCU.

6. The power distributing system of claim 1, wherein each of the plurality of seats is associated with a seat group of the aircraft, wherein the seat group comprises at least one passenger seat, and wherein the power supply is configured to supply power to each seat of the seat group.

7. The power distributing system of claim 1, wherein each of the plurality of seats is associated with a seat group of the aircraft, wherein the seat group comprises at least one passenger seat, and wherein the power supply is associated with the seat group.

8. The power distributing system of claim 1, wherein each passenger seat further comprises an associated a control unit, wherein the control unit is further configured to communicate with the PCU and a Cabin Service System Server.

9. The power distributing system of claim 8, wherein the Cabin Service System Server is configured to control the power supplied by the power supply, based on the supplied power level of each connected device for each respective PCU.

10. The power distributing system of claim 9, wherein the Cabin Service System Server is further configured to determine a charging priority for each connected device for each respective PCU.

11. A method of distributing power in an aircraft, the method comprising:
    providing a device connection via a USB port of a charging module at a passenger seat, wherein the device connection is (i) configured to supply power to a connected device and (ii) perform a handshake procedure with the connected device, wherein the handshake procedure comprises receiving an indication of both (i) a first power level to charge the connected device and operate the connected device and (ii) a second power level to operate the connected device but not charge the device;
    determining a supplied power level for a connected device with a passenger control unit (PCU) of the passenger seat, wherein the supplied power level is based on at least one of the indicated first power level and the second power level; and supplying power to at least one charging module based on the determined supplied power level via a power supply.

12. The method of claim 11, wherein each of the plurality of seats is associated with a seat group of the aircraft, wherein the seat group comprises at least one passenger seat, and further comprising communicating with each PCU of the seat group via a master PCU to determine a supplied power level of each connected device for each respective PCU in the seat group.

13. The method of claim 12, further comprising controlling the power supplied by the power supply via the master PCU, based on the supplied power level of each connected device for each respective PCU.

14. The method of claim 12, further comprising determining a charging priority for each connected device for each respective PCU via the master PCU.

15. The method of claim 11, wherein each of the plurality of seats is associated with a seat group of the aircraft, wherein the seat group comprises at least one passenger seat, and further comprising supplying power to each seat of the seat group via the power supply.

16. The method of claim 11, wherein each of the plurality of seats is associated with a seat group of the aircraft, wherein the seat group comprises at least one passenger seat, and wherein the power supply is associated with the seat group.

17. The method of claim 11, further comprising to communicating with the PCU and a Cabin Service System Server via a control unit of each passenger seat.

18. The method of claim 17, further comprising controlling the power supplied by the power supply via the Cabin Service System Server based on the supplied power level of each connected device for each respective PCU.

19. The method of claim 18, wherein the Cabin Service System Server is further configured to determine a charging priority for each connected device.

20. A method of distributing power in an aircraft, the method comprising:
assigning passenger seats of an aircraft to a plurality of seat groups, wherein for the plurality of seat groups;
supplying power to a passenger control unit (PCU) of a plurality of passenger seats via a power supply,
determining a priority for a plurality of connected devices within the group via a master PCU,
providing power to a respective PCU of the group based on the determined priority via the master PCU; and
for a plurality of passenger seats:
providing a device connection via a USB port of a charging module at the passenger seat, wherein the device connection is (i) configured to supply power to a connected device and (ii) perform a handshake procedure with the connected device, wherein the handshake procedure comprises receiving an indication of both (i) a first power level to charge the connected device and operate the connected device and (ii) a second power level to operate the connected device but not charge the device,
determining a supplied power level for a connected device with the PCU of the passenger seat,
communicating the power requirement from the PCU of the passenger seat to the master PCU, and supplying power provided by the power supply to at least one charging module.

* * * * *